United States Patent [19]

Voyt

[11] Patent Number: 4,891,136

[45] Date of Patent: * Jan. 2, 1990

[54] METHOD FOR CONTROLLING FILAMENTOUS ORGANISMS IN WASTEWATER TREATMENT PROCESSES

[75] Inventor: Walter F. Voyt, Joliet, Ill.

[73] Assignee: Amoco Corporation, Chicago, Ill.

[*] Notice: The portion of the term of this patent subsequent to Sep. 20, 2005 has been disclaimed.

[21] Appl. No.: 212,778

[22] Filed: Jun. 29, 1988

Related U.S. Application Data

[63] Continuation-in-part of Ser. No. 935,027, Nov. 26, 1986, Pat. No. 4,772,396.

[51] Int. Cl.[4] .............................................. C02F 3/30
[52] U.S. Cl. .................................... 210/605; 210/610; 210/631; 210/903
[58] Field of Search ............... 210/605, 610, 631, 903, 210/611, 630

[56] References Cited

U.S. PATENT DOCUMENTS

| 4,183,809 | 1/1980 | Klapwijk et al. | 210/903 |
| 4,552,663 | 11/1985 | Spector et al. | 210/605 |
| 4,772,396 | 9/1988 | Voyt | 210/605 |

FOREIGN PATENT DOCUMENTS

| 54-104655 | 8/1979 | Japan | 210/631 |
| 55-44332 | 3/1980 | Japan | 210/610 |
| 55-119496 | 9/1980 | Japan | 210/610 |
| 60-241998 | 11/1985 | Japan | 210/631 |

Primary Examiner—W. Gary Jones
Attorney, Agent, or Firm—Anthony J. Janiuk; William H. Magidson; Ralph C. Medhurst

[57] ABSTRACT

Methods for controlling sludge bulking in aerobic waste treatment processes are presented in which nitrogen metabolism is controlled and a steady seed of facultative nonfilamentous bacteria is provided to an aerobic waste treatment process.

3 Claims, 8 Drawing Sheets

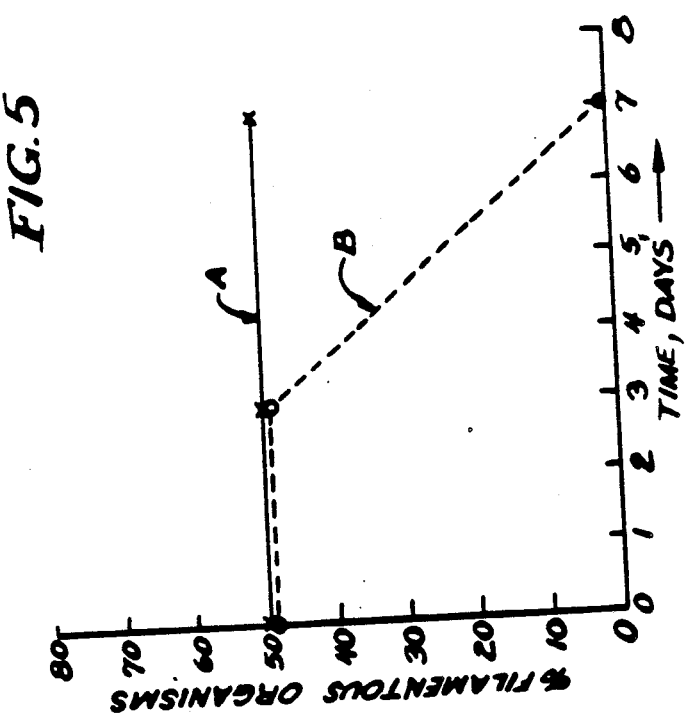
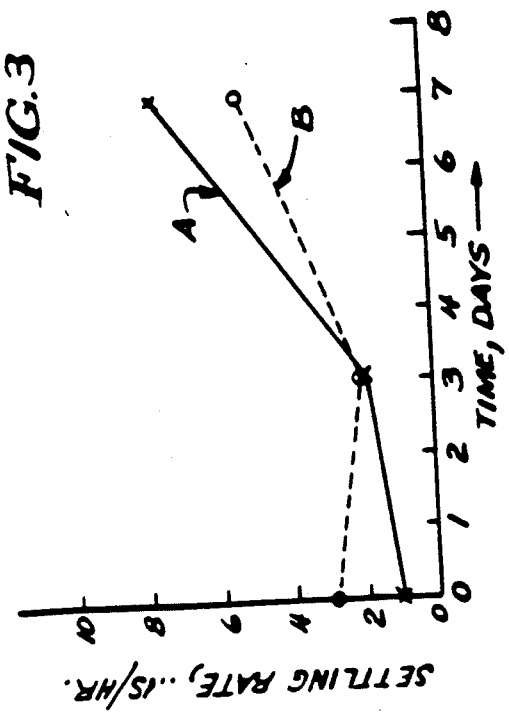
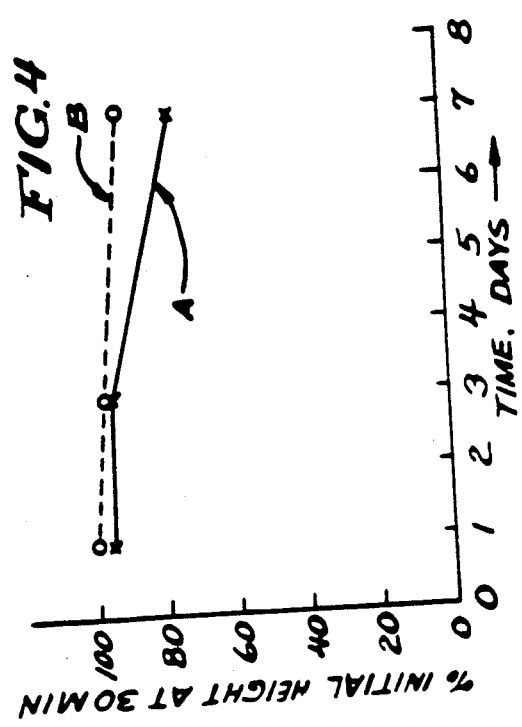

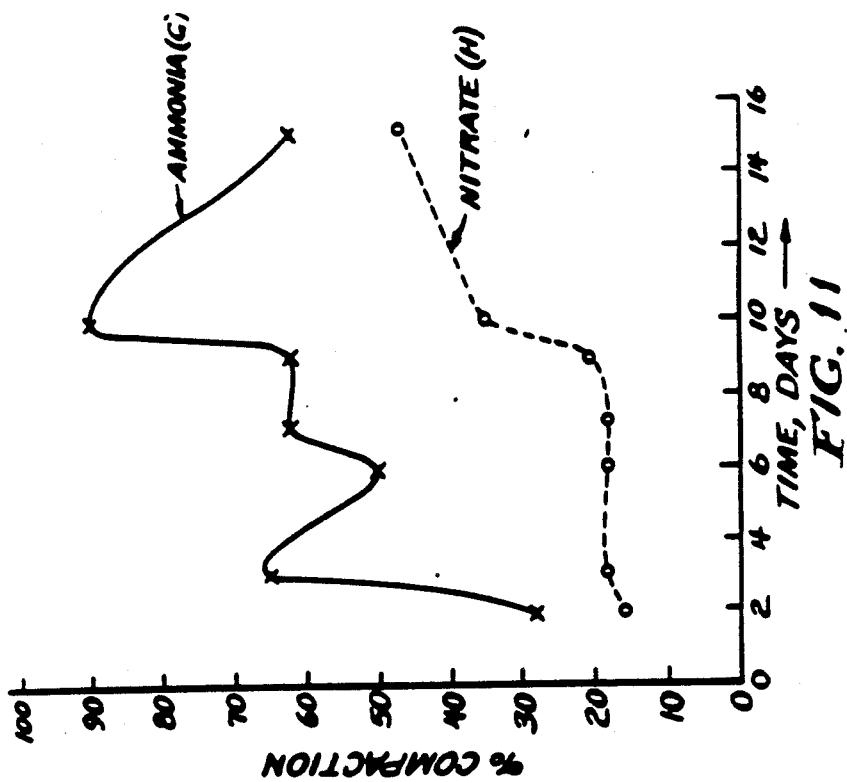
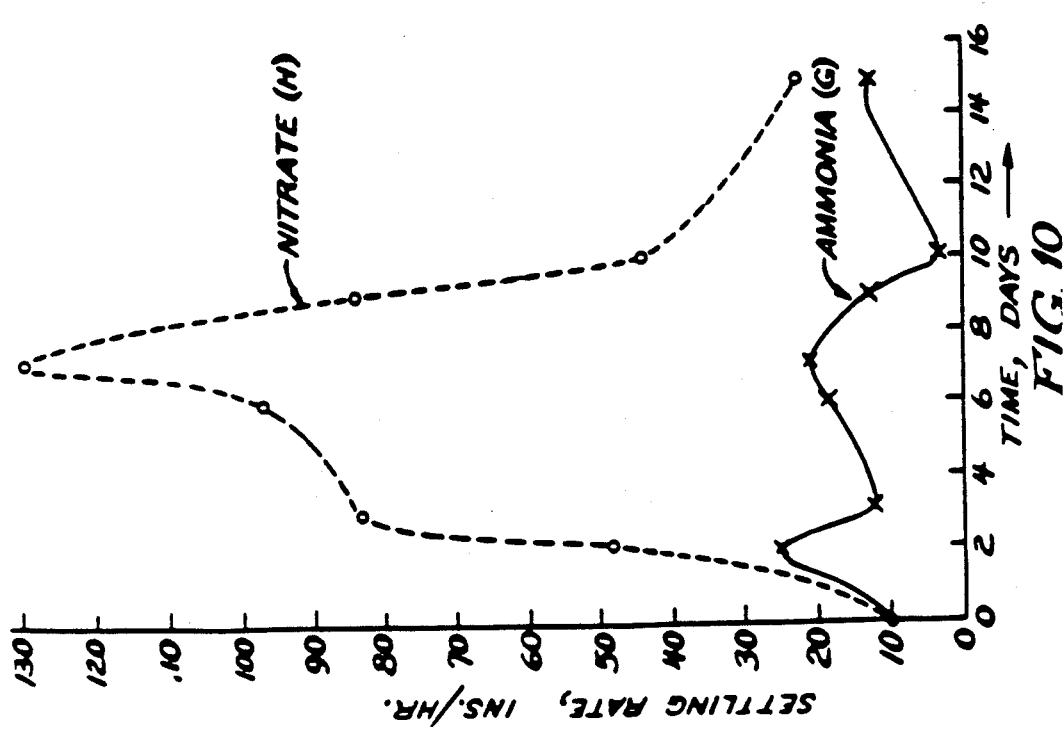

METHOD FOR CONTROLLING FILAMENTOUS ORGANISMS IN WASTEWATER TREATMENT PROCESSES

This application is a continuation-in-part of copending application Ser. No. 935,027, filed Nov. 26, 1986 now U.S. Pat. No. 4,772,396.

BACKGROUND

The present invention pertains to methods and apparatus for reducing or eliminating sludge bulking in waste treatment processes. In particular, the present invention is directed to methods and apparatus which encourage the selective growth of nonfilamentous organisms in aerobic waste treatment processes.

Aerobic wastewater treatment processes use an aerobic slurry of microorganisms referred to as an activated sludge to remove carbonaceous wastes by metabolic decomposition. Sludge bulking is the formation of voluminous nonsettling sludge due to excessive filamentous microorganisms. The organism frequently associated with sludge bulking is a filamentous bacteria designated type 021N (in the sense of Eikelboom, D. H., "Filamentous Organisms Observed in Activated Sludge," *Water Res.*, G.B.N. (Volume 9, 365) (1975).

The performance of an activated sludge process is determined by two considerations. The first consideration is the oxidation and conversion of colloidal and dissolved organic matter in the suspended microbial mass. The second consideration is a physical separation of the resulting microbial mass from the liquid by settling. For many activated sludge systems, the effectiveness of the physical separation of the resulting microbial mass from the liquid by settling may be rate limiting.

The settling properties of activated sludges have been related to several different factors. One of the most important factors is the relative number of filamentous and flocculent microorganisms in the activated sludge. Excessive numbers of filamentous organisms produce low settling velocities and high compaction values. Small numbers of filamentous organisms produces large flocs with high settling velocities and low compaction values.

Although several remedies for sludge bulking have been suggested and frequently attempted, they are largely ineffective. Usually sludge bulking persists for months in aerobic waste treatment processes until largely unknown factors cause the disappearance of the filamentous organisms.

SUMMARY OF THE INVENTION

The present invention includes methods to control filamentous organisms in an aerobic wastewater treatment process.

One embodiment of the present invention includes a method of restricting the growth of filamentous organisms in an aerobic wastewater treatment process in which wastewater is deficient in nitrogen. The method includes the step of supplementing the wastewater with an oxidized nitrogen source to control filamentous growth.

As used herein, the term oxidized nitrogen source includes nitrogen compounds characterized by the formula:

$$R-NO_Y$$

wherein "R" is an organic or inorganic moiety capable of being metabolized or disassociated to release an $NO_Y$ or $NO_{Y+1}$ moiety, or "R" is a hydroxyl group or hydrogen, and "Y" is the integer 1, 2 or 3.

Examples of oxidized nitrogen compounds include, without limitation, sodium nitrate, nitric acid, nitrous acid, sodium nitrite, calcium nitrate, potassium nitrate, and potassium nitrite. A preferred oxidized nitrogen source is nitric acid.

Some industrial wastes are deficient in nitrogen in varying degrees. Indeed, nitrogen can be undetectable in some waste streams. The amount of supplemental nitrogen necessary to support growth and metabolism under aerobic conditions is usually determined empirically. As applied to industrial type processes, supplemental nitrogen is usually added until a slight excess of nitrogen appears in the final effluent. In general, 100 pounds of total organic carbon (TOC) requires 3-10 pounds nitrogen. Thus, multiplying the required nitrogen by the molecular weight of the oxidized nitrogen source divided by the molecular weight of nitrogen equals the total oxidized nitrogen source requirement. By way of example, if the nitrogen requirement is 5 pounds per 100 pounds of TOC, and the preferred oxidized nitrogen source, nitric acid, is used, the total oxidized nitrogen requirement is about 22.5 pounds per each 100 pounds TOC.

A further embodiment of the present invention further comprises the steps of alternating an oxidized nitrogen source with a reduced nitrogen source. Preferably, the oxidized nitrogen source will be continued from about one to two sludge ages and then substituted for a period with the reduced nitrogen source.

As used herein, the term "reduced nitrogen source" includes nitrogen compounds characterized by the formula:

$$X-NH_Z$$

wherein "X" is an inorganic or organic moiety capable of being metabolized or disassociated to release the $NH_Z$ moiety, and "Z" is the integer 1, 2, 3 or 4. A preferred reduced nitrogen source includes ammonia and ammonia salts.

Methods of the present invention are described with respect to an apparatus for the removal of carbonaceous waste from wastewater. The apparatus includes a selective growth vessel containing facultative bacteria for aerobically removing nitrogen sources from the wastewater to produce a substantially denitrified effluent and a source of nonfilamentous facultative bacteria. The apparatus further includes an aerobic vessel containing aerobic bacteria for degrading carbonaceous waste. The aerobic vessel is placed in communication with the selective growth vessel to receive substantially denitrified effluent and nonfilamentous facultative bacteria. The constant seeding of the aerobic vessel with nonfilamentous facultative bacteria prevents or reduces the displacement of the facultative nonfilamentous bacteria with filamentous bacteria.

A further embodiment of the present invention includes steps for adding an oxidized nitrogen source to the selective growth vessel. The oxidized nitrogen source further controls the growth of nonfilamentous organisms.

A further embodiment of the present invention includes an aerobic tank adapted to receive a portion of the wastewater feed. Directing a portion of the wastewater feed to the aerobic vessel, which also receives processed wastewater feed in the form of denitrified effluent from the selective growth vessel, minimizes the amount of nitrogen that must be added to the aerobic vessel to support aerobic growth.

The use of a selective growth vessel upstream from an aerobic vessel acclimates nonfilamentous organisms in the selective growth vessel to the organic constituents of the wastewater under both aerobic and anoxic conditions. Further, the use of the selective growth vessel upstream from the aerobic vessel eliminates the build-up of potentially toxic soluble organic compounds in the selective growth vessel.

Splitting the feed between the selective growth vessel and an aerobic vessel downstream of the selective growth vessel eliminates the need for supplemental carbon in the selective growth tank to promote the denitrification process.

A further embodiment of the present invention includes a method for the removal of carbonaceous waste from wastewater. The method includes the steps of substantially anaerobically removing nitrogen sources from a wastewater feed to produce a substantially denitrified effluent and to produce a source of nonfilamentous facultative bacteria. Next, adding the substantially denitrified effluent and a portion of the nonfilamentous facultative bacteria into an aerobic process for degrading carbonaceous waste.

A further embodiment of the present invention includes the additional step of supplementing the aerobic process with an oxidized nitrogen source. A preferred oxidized nitrogen source includes nitric acid.

A further embodiment of the present method includes directing a portion of the wastewater feed to the aerobic process containing aerobic bacterial means. Directing a portion of the wastewater feed to the aerobic tank decreases the amount of nitrogen necessary to sustain growth.

The present invention features methods for the aerobic degradation of carbonaceous wastewaters including industrial waste which minimize sludge bulking caused by filamentous organisms. Other features and advantages of the present invention are disclosed in the following description of drawings and experimental examples which include a detailed description of the present invention. Those skilled in the art will recognize that the following drawings and detailed examples are capable of modification and alteration and the present invention should not be limited to the precise details set forth.

Other features and advantages of the present invention will be apparent from the following description, examples and illustrations, which by way of example, demonstrate preferred embodiments of the present invention and the principles thereof and what is now considered to be the best mode to apply these principles.

BRIEF DESCRIPTION OF THE DRAWINGS

FIGS. 3, 4, and 5 graphically compare settling rate versus time, sludge blanket height versus time, and the percent filamentous organisms versus time between conventional processes and processes embodying features of the present invention with particular reference to Example 1;

FIGS. 10 and 11 graphically compare settling rates and compaction properties between conventional processes and processes embodying features of the present invention with particular reference to Example 4;

DETAILED DESCRIPTION OF THE DRAWINGS AND EXAMPLES

Figure 1:
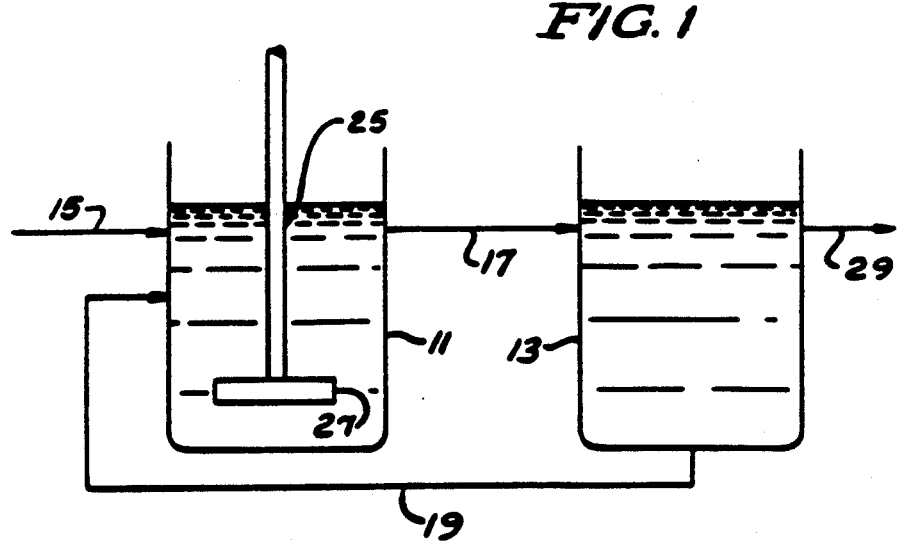
FIG. 1 is a schematic drawing of a conventional aerobic wastewater treatment process.

To facilitate discussion of the present invention reference will be made to FIGS. 1 and 2. FIG. 1 is a schematic drawing of a conventional aerobic wastewater treatment process. A conventional wastewater treatment process includes two major elements, an aerated vessel 11 and a clarifier 13.

The aerated vessel receives wastewater from a wastewater water feed line 15. The aerated vessel 11 is in communication with the clarifier 13 by means of a clarifier feed line 17. The clarifier feed line 17 feeds overflow from the aerated vessel 11 into the clarifier 13. The clarifier 13 is further in communication with the aerated vessel 11 by means of a clarifier underflow line 19 which receives organic sediment from the clarifier 13 and returns the sediment to the aerated vessel 11 for further processing.

The aerated vessel 11 is supplied with a source of air by means of an air line 25 and an air stone 27. Air line 25 and air stone 27 provide an oxygen source to the aerated vessel 11. Aerated vessel 11 contains facultative aerobic bacteria which requires a source of oxygen for growth and metabolism.

When operating within normal parameters, the facultative bacteria in the aerated vessel 11 decompose organic wastes. Bacteria, solids and effluent are carried to the clarifier 13 where they settle to the bottom to be transported back to the aerated vessel 11 by the underflow line 19.

Finally, overflow from the clarifier 13 is shunted from the clarifier by means of a clarifier overflow line 29. Effluent from the clarifier 13 flows through the clarifier overflow line 29 for further processing or to be returned to the environment. Filamentous bacteria settle poorly in the clarifier and can be discharged through the overflow line 29.

Figure 2:
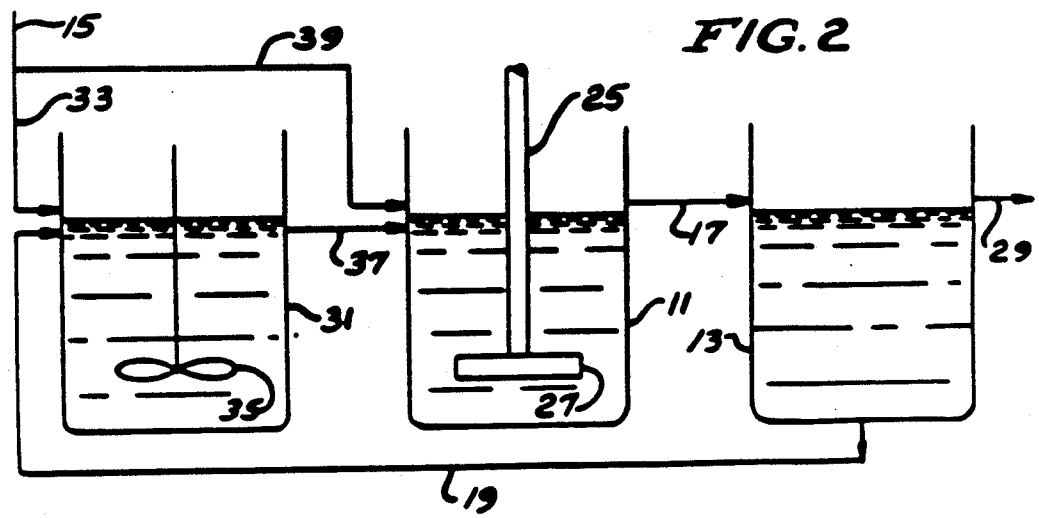
FIG. 2 is a schematic drawing of wastewater treatment process incorporating features of the present invention.

FIG. 2 illustrates, in schematic form, an embodiment of the present invention comprised of three major elements: an aerated vessel 11, a clarifier 13, and a selective growth vessel 31.

The selective growth vessel 31 is in communication with the water feed line 15 by means of a shunt 33. A stirrer 35 positioned within the selective growth vessel 31 stirs the contents of the selective growth vessel providing a substantially uniform consistency throughout the vessel. The selective growth vessel 31 contains, in addition to wastewater, facultative heterotrophic denitrification bacteria. Such bacteria are not filamentous and remove nitrogen from the wastewaters fed to the selective growth vessel 31.

Selective growth vessel 31 is in communication with the aerated vessel 11 by means of a denitrification feed line 37 extending between the selective growth tank 31 and the aerated vessel 11. The denitrified feed line feeds a denitrified effluent into the aerated vessel 11 where carbonaceous wastes are degraded aerobically by bacteria. The denitrified feed line 37 further seeds the aerated vessel 11 with a substantially constant influx of facultative heterotrophic denitrification bacteria that have become accustomed to the organic constituents of the wastewater under anoxic conditions in the selective growth vessel 31. The facultative bacteria, which are not filamentous, are capable of aerobically decomposing the carbonaceous waste of the wastewater contained in the aerated vessel 11. The constant seeding of the aerated vessel 11 with facultative denitrification bacteria prevents the overgrowth of filamentous bacteria in the aerated vessel 11.

The aerated vessel 11 also receives wastewater directly from the wastewater feed line 15 by means of a wastewater feed line shunt 39. Splitting the feed between the selective growth vessel 31 and the aerated vessel 11 minimizes the amount of nitrogen that must be added to grow nonfilamentous organisms within the aerated vessel 11. Further, splitting of the feed between the selective growth vessel 31 and the aerated vessel 11 minimizes the build-up of soluble organic compounds in the selective growth vessel 31 that are potentially toxic to the facultative heterotrophic denitrification bacteria. Additionally, the addition of carbonaceous waste to the selective growth vessel removes the need for supplemental carbon sources to be added to the selective growth vessel 31 in order for denitrification metabolism to take place.

The aerated vessel 11 is provided with an air line 25 and an air stone 27 to aerate the vessel to provide for aerobic respiration of the facultative bacteria contained therein.

The aerated vessel 11 is in communication with a clarifier 13 by means of a clarifier feed line 17. The clarifier 13 allows solids carried from the aerated vessel 11 by the clarifier feed line 17 to settle. Solids which have settled to the bottom of the clarifier 13 are returned to the selective growth vessel 31 by means of a clarifier underflow line 19 in communication the lower portion of the clarifier 13 and the selective growth vessel 31.

Overflow from the clarifier 13 is removed by a clarifier overflow line 29. Effluent from the clarifier 13 can be processed further or returned to the environment.

The present invention is further described in the following typical procedures and experimental examples which exemplify features of the preferred embodiment. All materials are of industrial or analytical grade unless otherwise indicated.

EXAMPLE 1

In Example 1, Unit A was a control biox unit having a conventional structure as illustrated in FIG. 1. Thus, Unit A included a single aerated vessel 11 followed by a clarifier 13. Wastewater was fed to the aerated vessel 11 by a wastewater feed line 15. Water flowed from the aerated vessel 11 to the clarifier 13 by a clarifier feed line 17. Clarifier underflow was recycled to the aerated vessel by a clarifier underflow line 19. Clarifier overflow, which represented treated wastewater, was removed by a clarifier overflow line 29.

Unit B was a biox unit incorporating features of the present invention as illustrated in FIG. 2. Unit B included a single aerated vessel 11, a clarifier 13 and a selective growth vessel 31. Wastewater was fed to both the aerated vessel 11 and the selective growth vessel 31 via a wastewater feed line 15 which was split to a first shunt 33 which fed the selective growth vessel 31 and a second shunt 39 which fed wastewater feed to the aerated vessel 11. Ninety percent of the total feed flow was to the aerated vessel 11 and the remaining 10 percent to the selective growth vessel 31.

Overflow from the selective growth vessel 31 was also carried to the aerated vessel 11 by means of a denitrified feed line 37. The aerated vessel 11 was equipped with an air line 25 and an air stone 27 to aerate the media for aerobic growth. The selective growth vessel 31 was provided with a stirrer 35 to circulate and mix the contents thereof. The selective growth vessel 31 was not aerated in order to provide an anoxic media for facultative nonfilamentous heterotrophic denitrification bacteria.

The aerated vessel 11 was in communication with the clarifier 13 by means of a clarifier feed line 17 which permitted the movement of liquor from the aerated vessel 11 to the clarifier 13. The clarifier 13 was equipped with a clarifier overflow line 29. Clarifier overflow represented treated wastewater. Clarifier 13 was also equipped with a clarifier underflow line 19 in communication with the selective growth vessel 31. Solids and bacteria were recycled to the selective growth vessel 31.

Process information describing the equipment, operating parameters and wastewater composition is set forth below:

TABLE I

|  | Biox Unit | |
| --- | --- | --- |
|  | A | B |
| Aerated vessel volume, l | 3.5 | 3.5 |
| Clarifier volume, ml | 250 | 250 |
| Denitrification vessel volume, ml | none | 500 |
| Total feed flow rate, ml/d | 600 | 600 |
| Feed flow rate to B aerated vessel, ml/d | — | 540 |
| Feed flow rate to B denitrification vessel, ml/d | — | 60 |
| Feed organic carbon concentration, mg/l | 2400 | 2400 |
| Clarifier recycle rate, ml/d | 1600 | 1600 |
| Air flow rate to aerated vessel, l/min | 2 | 2 |

|  |  | B | |
| --- | --- | --- | --- |
| Wastewater feed composition: | A | Aerated | Selected Growth |
| Acetic acid, g/l | 6 | 6 | 6 |
| NH$_4$ Cl, g/l | .46 | none | none |
| HNO$_3$, g/l | none | .57 | 2.28 |
| K H$_2$ PO$_4$, g/l | 0.1 | 0.1 | 0.1 |
| NaOH, g/l | 0.5 | 0.5 | 0.5 |

Both Units A and B were seeded by adding mixed liquor from an aerobic industrial waste treatment process to the clarifiers 13, aerated vessels 11 and the selective growth tank 31. The initial suspended solids concentration in both units was about 2,200 mg/l and the biomass of the mixed liquor consisted of about 50 percent filamentous organisms as determined microscopically.

Both units were operated continuously for seven days. Slude wastage was batch, once per day, and consisted of about 50 ml/d. Temperatures during the test period were the same for both units and varied with ambient temperatures which ranged from 72° to 82° F. During the test period, the selective growth vessel 31 of Unit B bubbled.

During the study period, samples were withdrawn from the unit for characterization, including a settling test, a sludge compaction test, and a filamentous organism concentration analysis. After testing, samples were returned to the unit except for chemical analysis samples which were taken from wastage.

The settling test was done in a 4-liter graduated cylinder with a 1-rpm stirrer which ran top to bottom of the graduated cylinder. Settling rate was measured as the fastest rate within one half hour that the sludge blanket separated from the supernatant in inches per hour.

The sludge compaction test consisted of determining the ratio percent of the initial sludge blanket height to the sludge blanket height after one half hour of the settling.

Filamentous organism concentration was estimated by measuring the area occupied by filamentous and nonfilamentous microorganisms with a microscope at 100 power magnification. Information gathered from these tests is set forth in FIG. 3 which illustrates settling rate versus time, FIG. 4 which illustrates sludge blanket height versus time, and FIG. 5 which illustrates percent filamentous organisms versus time. Information gathered from these tests is also set forth below in Table 2.

TABLE II

| Time, Days | Settling Rate, ins/hr | | Compaction, % | | % Filamentous Organisms | |
|---|---|---|---|---|---|---|
| | A | B | A | B | A | B |
| 0 | 1 | 3 | 97 | 91 | 50 | 50 |
| 3 | 2 | 2 | 94 | 94 | 50 | 50 |
| 7 | 8 | 5 | 76 | 91 | 50 | 0 |

| | Unit A | Unit B | |
|---|---|---|---|
| | Aerated Vessel | Aerated | Denitrification |
| pH | 7.8 | 8.0 | 7.0 |
| $NO_3$—N, mg/l | — | 3 | 0.5 |
| $NH_3$—N, mg/l | — | 0.3 | 0.8 |
| Soluble Organic carbon, mg/l | 17 | 14 | 34 |

On the seventh day of the experiment the biomass from Unit A appeared to be the same as at the start of the test when observed with a microscope at 100 power. On the seventh day of the experiment, Unit A's biomass still consisted of about 50 percent filamentous microorganisms.

No filamentous organisms could be observed in the biomass from Unit B on the seventh day. Rather, all of the biomass consisted of small dispersed microorganisms.

On the last day of the experiment, the slow speed stirrer of the settling test equipment was observed boring a hole through the sludge blanket of Unit B's biomass during the settling test indicating pronounced wall effects from the graduated cylinder. The configuration and operation of Unit A was representative of a completely mixed suspended growth aerobic activated sludge process which is widely used to treat wastewater. The feed to this unit was supplemented with sufficient ammonia nitrogen to allow maximum growth of the biomass as is the common practice for industrial wastewaters that are deficient in nitrogen. Unit B included a selective growth vessel 31 which denitrified a portion of the wastewaters being received by the aerated vessel 11 and provided a continuous seed of facultative heterotrophic nonfilamentous bacteria to the aerated vessel 11.

Splitting of the feed between the aerated vessel 11 and the selective growth vessel 31 minimized the amount of nitrogen that must be supplemented to the aerated vessel 11 to support the biomass. Further, splitting the feed eliminated the build-up of soluble organic compounds in the selective growth vessel 31 that potentially are toxic to the facultative heterotrophic nonfilamentous bacteria. No further supplemental carbon is necessary to support the denitrification process taking place under anoxic conditions in the selective growth vessel 31.

The selective growth vessel 31 provides a source of nonfilamentous organisms which are acclimated to the organic constituents of the wastewater under both aerobic and anoxic conditions. Such nonfilamentous organisms are capable of competing with filamentous aerobic organisms which would otherwise cause problems of sludge bulking.

EXAMPLE 2

In Example 2, Units C and D were biox units having identical, conventional structures as set forth in FIG. 1 and described as Unit A in the preceding example. A description of the equipment, operating parameters and wastewater feed composition is set forth below in Table 3:

TABLE III

| | Unit C | Unit D |
|---|---|---|
| Aerated vessel volume, l | 3.5 | 3.5 |
| Clarifier volume, ml | 250 | 250 |
| Total feed flow rate, ml/d | 600 | 600 |
| Clarifier recycle rate, l/d | 1.6 | 1.6 |
| Air flow to aerated vessel, l/min | 2 | 2 |
| Wastewater feed composition: | Unit C | Unit D |
| Acetic acid, g/l | 6 | 6 |
| Ammonium chloride, g/l | 0.46 | none |
| Nitric acid, ml/l | none | 0.57 |
| $KH_2 PO_4$, g/l | 0.1 | 0.1 |
| Sodium Hydroxide, g/l | 0.5 | 0.5 |
| Organic Carbon, g/l | 2.4 | 2.4 |

The feed to both units was supplemented with the same amount of nitrogen and was sufficient for good growth of the biomass. Unit C received a reduced nitrogen source in the form of ammonia, and Unit D received an oxidized nitrogen source, nitric acid.

Units C and D were seeded by adding mixed liquor from an industrial aerobic waste treatment process to the respective aeration vessel.

The seed biomass consisted of about 50 percent filamentous organism as determined microscopically. The seed biomass had previously been receiving ammonia during the industrial wastewater process. The units were operated with continuous feed and clarifier recycle for 13 days. Sludge wastage was batch, once perday and consisted of 50 m/l taken from the aerated vessel. Temperature during the test period was the same for both units and varied with ambient temperatures ranging from 72° to 85° F.

During the study period samples were withdrawn from the aerated vessel for settling tests, a compaction test, a filamentous organism test and chemical testing. All tests were taken in accordance with standard procedures. Data gathered during the test period are summarized below in Table VI.

TABLE IV

Settling Rate and % Compaction of Mixed Liquor Solids

| Time, Days | Settling Rate, ins/hr | | Compaction, % | |
|---|---|---|---|---|
| | C | D | C | D |
| 0 | 7 | 4 | 92 | 92 |
| 1 | 1 | 7 | 96 | 78 |
| 2 | 1 | 27 | 96 | 30 |
| 3 | ½ | 26 | 96 | 38 |
| 6 | ½ | 20 | 100 | 50 |
| 8 | 6 | 18 | 90 | 52 |
| 1 | 1 | 36 | 96 | 48 |
| 12 | 2 | 21 | 96 | 38 |
| 13 | 4 | 21 | 94 | 40 |

Mixed Liquor Quality

| Time, Days | pH | NO3—N | NH3—N | TOC | % SS | % Alkalinity |
|---|---|---|---|---|---|---|
| | C/D | C/D | C/D | C/D | C/D | C/D |
| 1 | 8.2/8.2 | | | 12/12 | | |
| 2 | 8.1/8.3 | —/7.5 | 1.5/— | 21/13 | | |
| 3 | 7.6/8.0 | .8/.8 | .2/.2 | 16/15 | .17/.19 | |
| 6 | 7.5/8.0 | | | | .19/.19 | |
| 8 | 7.3/7.8 | | | | .19/.15 | 620/950 |
| 10 | 7.1/7.8 | <.5/7.7 | .3/.3 | 77/9 | .19/.13 | |
| 13 | 7.3/8.1 | 2/3 | .3/.3 | 38/18 | .24/.15 | |

Results are in mg/l except suspend solids (SS), TOC is total organic carbon. Alkalinity is mg/l. NaHCO3, NO3—N, NH3—N and TOC are for filtered samples.

On the second day of the test, average filamentous organism length was measured with a microscope at 100 magnification by randomly selecting 10 filaments for measurement. The results of the filament organism length measurements are set forth in Table V.

TABLE V

Filamentous Organism Length, um

| C Reactor | D Reactor |
|---|---|
| 180 | 110 |
| 220 | 50 |
| 110 | 60 |
| 250 | 60 |
| 180 | 140 |
| 200 | 140 |
| 180 | 130 |
| 300 | 130 |
| 80 | 110 |
| 110 | 110 |
| AVERAGE = 181 um | 103 um |

Figure 7:
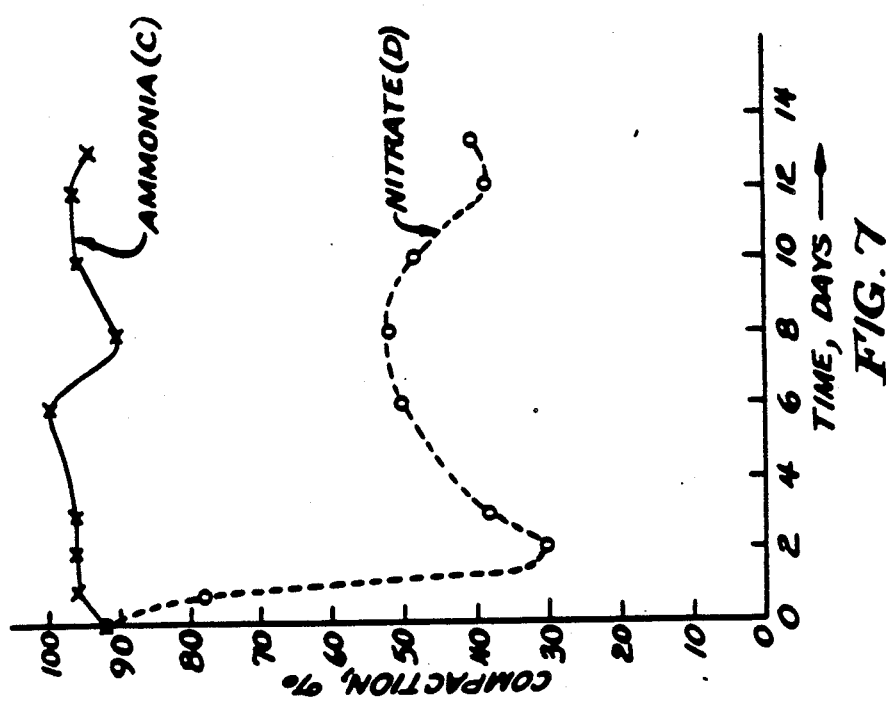
FIGS. 6 and 7 graphically compare settling rates and compaction properties between conventional processes and processes embodying features of the present invention with particular reference to Example 2.
Figure 6:
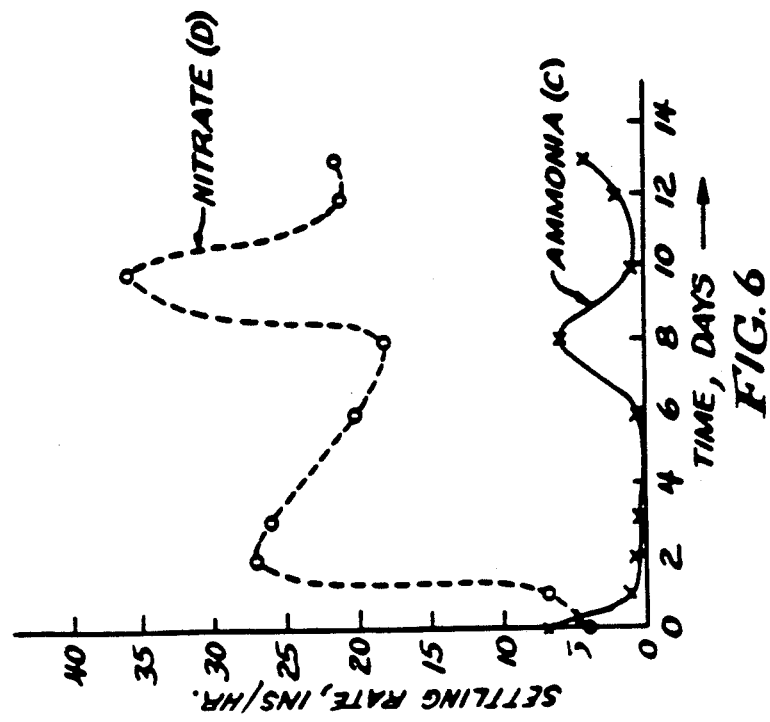

FIG. 6 describes the settling rate over a 14-day period. Unit D points are represented by circles, and Unit C points are represented by X's. Similarly, FIG. 7 describes the compaction of the liquor biomass for Units C and D. Points describing Unit C are represented by X's, and points describing Unit D are represented by circles. Settling and compaction for Unit D immediately improved compared to Unit C and remained better than Unit C for about two sludge ages.

The average filamentous organism length of Unit C biomass was about 75 percent greater than the average filamentous organism length of Unit D on the second day of the test although both were the same initially.

The seed biomass for both units had received supplemental nitrogen in the form of a reduced nitrogen source, ammonia, prior to the test. A rapid switch from ammonia nitrogen to an oxidized nitrogen source, nitrate or nitrite, under conditions otherwise favorable for filamentous organism growth reduced the growth of filamentous organisms and resulted in better sludge settling and compaction.

EXAMPLE 3

In Example 3, Units E and F are biox units having a conventional structure as set forth in FIG. 1 and as described relative to Unit A. Process information describing the equipment, operating parameters, and wastewater composition is identical to Example 2 with the exception that no wastage of mixed liquor from the aerated vessels were taken. Therefore, the sludge age increased from an initial 21 days to 29 days at the end of the test.

A description of the equipment, operating parameters and wastewater feed composition is set forth below in Table 6:

TABLE VI

| | Unit E | Unit F |
|---|---|---|
| Aerated vessel volume, l | 3.5 | 3.5 |
| Clarifier volume, ml | 250 | 250 |
| Total feed flow rate, ml/d | 600 | 600 |
| Clarifier recycle rate, l/d | 1.6 | 1.6 |
| Air flow to aerated vessel, l/min | 2 | 2 |
| Wastewater feed composition: | Unit E | Unit F |
| Acetic acid, g/l | 6 | 6 |
| Ammonium chloride, g/l | 0.46 | none |
| Nitric acid, ml/l | none | 0.57 |
| KH2 PO4, g/l | 0.1 | 0.1 |
| Sodium Hydroxide, g/l | 0.5 | 0.5 |
| Organic Carbon, g/l | 2.4 | 2.4 |

The seed biomass was taken from an industrial aerobic waste treatment process that had been supplemented with ammonia nitrogen. Filamentous organisms initially constituted about 60 percent of the seed biomass. The equipment was run for a test period of eight days. Data gathered during the test period are summarized in Table 7 below:

TABLE VII

Settling Rate and % Compaction of Mixed Liquor Solids

| Time, Days | Settling Rate, ins/hr | | Compaction, % | |
|---|---|---|---|---|
| | E | F | E | F |
| 0 | 5 | 5 | — | — |
| 2 | 1½ | 20 | 95 | 47 |
| 3 | 1 | 20 | 97 | 41 |
| 4 | 2 | 24 | 88 | 41 |
| 8 | 24 | 36 | 53 | 41 |

Mixed Liquor Quality

| Time, Days | pH | TOC | SS |
|---|---|---|---|
| | E/F | E/F | F/F |
| 0 | — | — | .28/.28 |
| 3 | 7.8/8.1 | 17/12 | .28/.24 |
| 8 | — | — | .35/.29 |

TOC = soluble total organic carbon, mg/l
SS = Total suspended solids, %

Referring now to Unit E, the settling rate of mixed liquor solids was poor initially and became worse during the first four days. Turning now to Unit F, the initial switch from a reduced nitrogen source such as ammonia to a oxidized nitrogen source, such as nitric acid, improved the settling and compaction characteristics of Unit F's mixed liquor solids under conditions that resulted in poor settling and compaction for Unit E.

Figure 9:
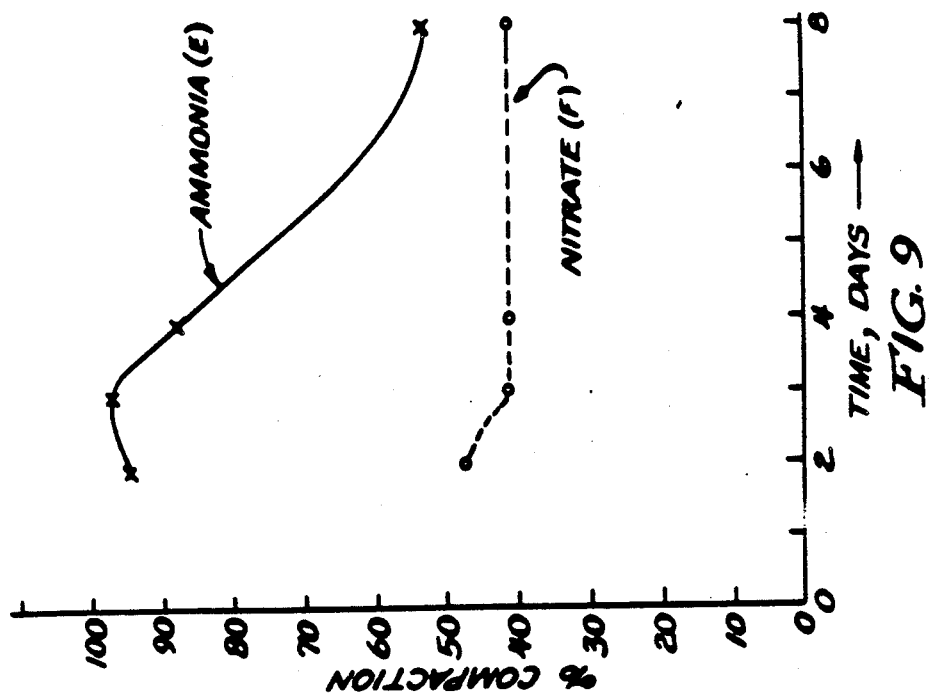
FIGS. 8 and 9 graphically illustrate settling rates and compaction properties between conventional processes and processes embodying features of the present invention with particular reference to Example 3.
Figure 8:
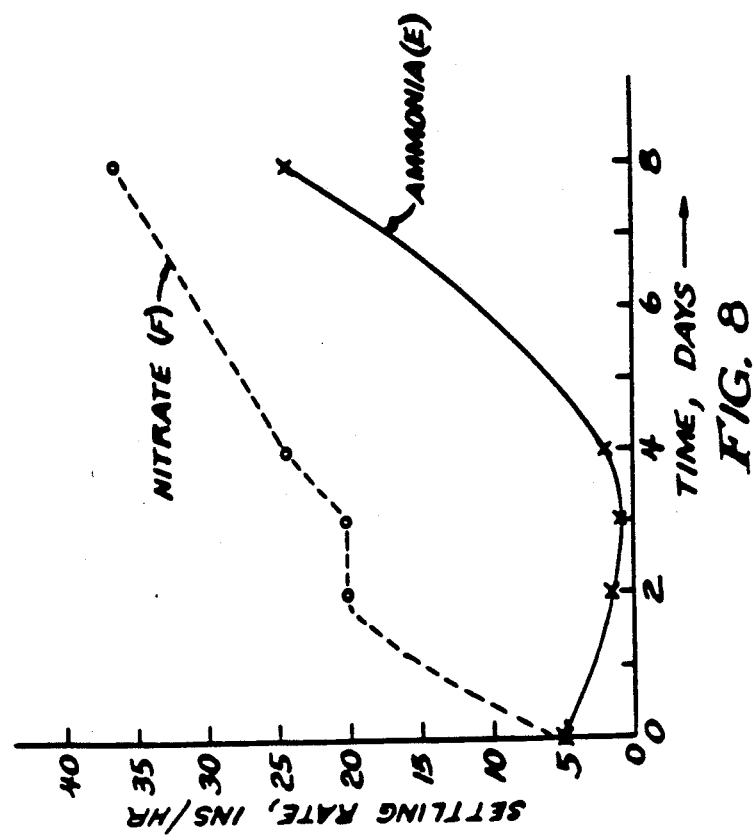

The settling and compaction results are illustrated graphically in FIGS. 8 and 9. Data points for Unit E are represented by X's and data points for Unit F are represented by circles.

A switch from a reduced nitrogen source to an oxidized nitrogen source in the feed was required for eight days to prevent deterioration in mixed liquor solids settling and compaction properties. After the conditions that favor poor settling are eliminated, the addition of a oxidized nitrogen source such as nitric acid can be discontinued and reduced nitrogen source such as ammonia substituted.

EXAMPLE 4

In Example 4, Units G and H are biox units having a conventional structure as set forth in FIG. 1 and described as Unit A previously. A description of the equipment, operating parameters and wastewater feed composition is set forth in Table 8 below:

TABLE VIII

|  | Unit G | Unit H |
|---|---|---|
| Aerated vessel volume, l | 3.5 | 3.5 |
| Clarifier volume, ml | 250 | 250 |
| Total feed flow rate, ml/d | 600 | 600 |
| Clarifier recycle rate, l/d | 1.6 | 1.6 |
| Air flow to aerated vessel, l/min | 2 | 2 |
| Wastewater feed composition: | Unit G | Unit H |
| Ammonium chloride, g/l | 0.46 | none |
| Nitric acid, m/l | none | 0.57 |
| $KH_2PO_4$, g/l | 0.1 | 0.1 |
| Total organic carbon, g/l | 2.4 | 2.4 |

The feed to both Units G and H was an industrial wastewater which was supplemented with nitrogen and phosphorus. However, Unit G received a reduced nitrogen source in the form of ammonium chloride and Unit H received an equivalent amount of nitrogen in an oxidized form, namely, nitric acid. The equipment was operated for a 15-day period with continuous feed and clarifier recycle. Sludge wastage was batch, once per day, and consisted of 500 m/l taken from the aerated vessel.

Temperature during the test period was the same for both units and varied with ambient temperature which ranged from 72° to 85° F. During the study period, samples were withdrawn from the aerated vessel for a settling test, compaction test, a filament organism test, and chemical testing. All tests were taken in accordance with standard procedures.

On days 2, 6, and 9 of the experiment, the organic carbon of the wastewater was increased to 4.8 g/l for 24 hours by adding 6 g/l of acetic acid to the industrial wastewater. Supplemental nitrogen and phosphorus were also doubled during this time.

The seed biomass was taken from an industrial aerobic waste treatment process which had been receiving feed wastewater with ammonia nitrogen. The seed biomass was simultaneously added to the respective aerated vessels of both Units G and H. Filamentous organisms initially constituted about 50 percent of the seed biomass.

Data gathered during the experiment are summarized in Table IX below.

TABLE IX

Settling Rate and % Compaction of Mixed Liquor Solids

| Time, Days | Settling Rate, ins/hr G | H | Compaction, % G | H |
|---|---|---|---|---|
| 0 | 10 | 10 | — | — |
| 2 | 25 | 48 | 28 | 16 |
| 3 | 11 | 83 | 67 | 18 |
| 6 | 18 | 97 | 50 | 18 |
| 7 | 21 | 165 | 62 | 16 |
| 9 | 13 | 84 | 62 | 21 |
| 10 | 3 | 42 | 90 | 35 |
| 15 | 13 | 22 | 62 | 47 |

Mixed Liquor Quality

| Time, Days | pH G/H | $NO_3$—N G/H | $NH_3$—N G/H | % SS G/H | TOC G/H |
|---|---|---|---|---|---|
| 3 | 7.7/8.2 | <.5/<.5 | 2.6/1.8 | — | 26/26 |
| 6 | — | — | — | .33/.21 | — |
| 7 | — | — | — | .34/.19 | 120/120 |
| 8 | — | — | — | .31/.14 | 110/120 |
| 13 | — | — | — | .32/.20 | 130/110 |
| 15 | — | — | — | .28/.23 | 90/95 |

Results in mg/l
TOC = Total organic carbon, mg/l
SS = Total organic carbon

On the third day of the test, average filamentous organism length was measured with a microscope at 100 magnification by randomly selecting ten filaments for measurements. The results of the filaments length measurement evaluation is set forth in Table X below.

TABLE X

Filamentous Organism Length, um

| G Reactor | H Reactor |
|---|---|
| 550 | 190 |
| 220 | 180 |
| 130 | 100 |
| 500 | 160 |
| 250 | 220 |
| 450 | 90 |
| 320 | 60 |
| 150 | 170 |
| 380 | 220 |
| 320 | 160 |
| AVERAGE = 322 um | 155 um |

On day 7, the mixed liquor of both units was examined at 100 magnification with a microscope. The filamentous microorganisms of Unit G constituted about 70 percent of the entire biomass and about 40 percent of the biomass in Unit H. On day 8, the mixed liquor of both units was viewed at 100 magnification with a microscope. The filamentous microorganisms of Unit G had not changed since day 7. The nonfilamentous microorganisms of Unit H had changed from relatively compact flocs to much less compact flocs that looked like dispersed fine grains of sand.

Settling rates and compaction tests are set forth in FIGS. 10 and 11, respectively. Data points for Unit G are represented by X's and data points for Unit H are represented by circles.

Clearly, when the industrial wastewater was supplemented with an oxidized nitrogen source, an immediate improvement in settling and compaction of the sludge occurred. During the same period, settling and compaction properties deteriorated in the industrial wastewater supplemented with a reduced nitrogen source, such as ammonia.

The rapid increase in organic carbon on days 2, 6 and 9 of the test were intended to stimulate the growth of filamentous organisms. The filamentous organisms did indeed grow in the reactor whose feed was supplemented with a reduced nitrogen source but did not increase in the reactor whose feed was supplemented with an oxidized nitrogen source, such as nitric acid.

The microscopic examinations confirm that filament length as well as the percent composition of filaments in the total biomass was higher in the biox unit that was supplemented with a reduced nitrogen source than in the biox unit supplemented with an oxidized nitrogen source throughout the test period.

Although the biox unit receiving an oxidized nitrogen source steadily improved in settling and compaction characteristics for one sludge age, the biox unit then experienced a decrease in settling and compaction properties over the next such age. It is believed that the filamentous organisms slowly adapted to the oxidized nitrogen source. In this example, the addition of a supplemental oxidized nitrogen source was harmful to the settling and compaction characteristics of the activated sludge if the addition period extended beyond about two sludge ages. After about one or two sludge ages, the oxidized nitrogen supplement should be replaced with a reduced nitrogen supplement.

EXAMPLE 5

Figure 12:
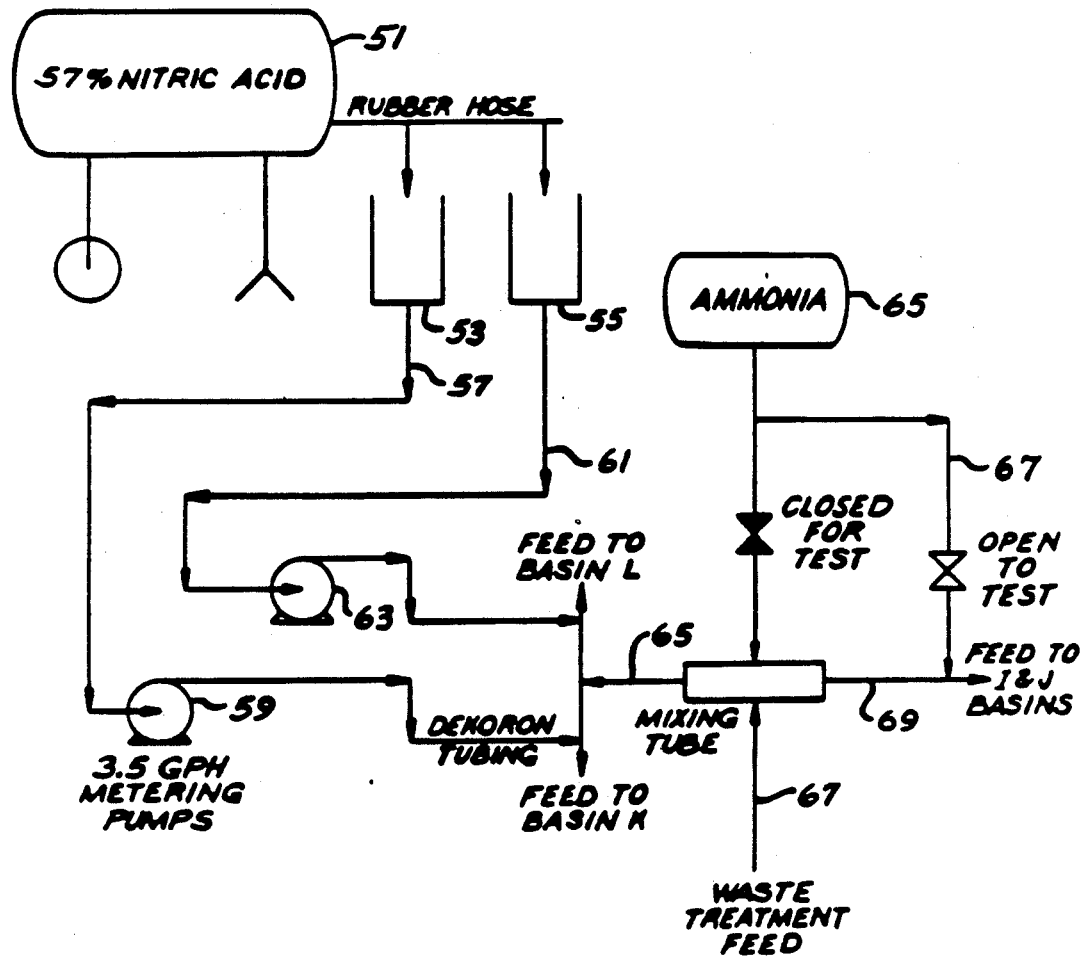
FIG. 12 is a schematic drawing of industrial scale system embodying features of the present invention.

An embodiment of the present method was applied on an industrial scale. The plant test equipment included two day tanks, two metering pumps, nitric acid vessel and four test basins as described in FIG. 12. Nitric acid (57 percent) was transferred by gravity from a nitric acid vessel 51 to two day tanks 53 and 55. One day tank 53 was in communication with aeration basin K through line 57 and metering pump 59. The other day tank 55 was in communication with aeration basin L through line 61 and metering pump 63. Aeration basins K and L received wastewater through a shunt 65 from a common wastewater stream 67.

Nitric acid was fed to aeration basins K and L between Dec. 17, 1985, and Jan. 6, 1986. During this time no ammonia was fed to aeration basins K and L. The average feed rate of nitric acid to aeration basins K and L was approximately 3.5 gallons per hour.

Ammonia was added to two other aeration basins, aeration basins I and J, which acted as controls. Ammonia was fed to aeration basins I and J from an ammonia tank 69 in communication with aeration basins I and J by means of an ammonia feed line 71 which fed into a wastewater feed shunt 73. Shunt 73 fed ammonia and wastewaters to aeration basins I and J. Shunt 73 received wastewater from a common wastewater stream 67.

Nitric acid was not added to aeration basins K and L on December 19 and 20 in order to reduce the high nitric concentration of the mixed liquor. Ammonia was not added to aeration basins I and J on December 19 also in order to reduce the high nitric concentration of the controlled basins mixed liquor. Nitrogen levels were high in all basins due to pretest over addition of ammonia. Throughout the test, special and routine samples were caught, analyzed and monitored for nitrate and ammonia concentration, as well as for mixed liquor, clarifier overflow and air flotation unit (AFU) effluent quality. Settling and sludge volume index tests were performed daily on secondary aeration basin mixed liquor, for both the control and test train of basins.

Nitric acid additions stopped on Jan. 6, 1986, after which normal addition of a reduced nitrogen source, ammonia, was resumed.

The organic loading rate to aeration basins K and L ranged from 1,477 to 13,121 pounds per day of organic carbon (TOC) during the test. About a 600 percent increase in TOC loading occurred between Dec. 18 and Dec. 21, 1986. The feed to mass ratio (F/M) increased 400 percent during the same period.

The ratio of nitric acid nitrogen ($NO_3$—N) to total organic carbon (TOC) ranged from 2.5 to 14.2 pounds of $NO_3$—N to 100 pounds of TOC in the test aeration basin feed. The average $NO_3$—N concentration in the feed was 7.3 pounds of nitrogen/100 pounds-TOC. Residual $NO_3$—N concentration in basins K and L mixed liquor was about 1 to 3 mg/l $NO_3$—N. The results of the test are set forth more fully in Table XI.

TABLE XI

Operational and Quality Parameters for E and F Aeration Basins During $NO_3$ Test

| Date | Approx. Loading, TOC lbs/d | Approx. F/M Ratio | Lbs of $NO_3$—N Per 100 lbs-TOC | Residual $NO_3$—N* K-Basin | L-Basin |
|---|---|---|---|---|---|
| 12/17/85 | 3015 | .063 | 8.9 | | |
| 12/18/85 | 2175 | .056 | 17.5 | | |
| 12/19/85 | 9265 | .212 | ~0 | 55 | 60 |
| 12/20/85 | 11912 | .238 | ~0 | 38 | <.5 |
| 12/21/85 | 13121 | .228 | 2.5 | <5 | <5 |
| 12/22/85 | 13006 | .189 | 3.6 | 2 | 0.8 |
| 12/23/85 | 7596 | .099 | 6.5 | 3 | .7 |
| 12/24/85 | 3860 | .048 | 7.0 | 2.5 | — |
| 12/25/85 | 3315 | .048 | 8.3 | 3 | .8 |
| 12/26/85 | 3524 | .049 | 14.2 | 2 | 2.5 |
| 12/27/85 | 3608 | .050 | 5.4 | 3.5 | 2 |
| 12/88/85 | 3189 | .024 | 7.1 | <.5 | <.5 |
| 12/29/85 | 1564 | .020 | 7.2 | <.5 | <.5 |
| 12/30/85 | 1656 | .022 | 6.8 | 6 | <.5 |
| 12/31/85 | 3515 | .050 | 4.7 | 1 | <.5 |
| 12/01/86 | 2458 | .034 | 7.1 | 4 | 3 |
| 12/02/86 | 3031 | .042 | 4.3 | 1 | 1 |
| 12/03/86 | 2904 | .040 | 5.2 | 2 | 2.1 |
| 12/04/86 | 3159 | .044 | 5.7 | 3.4 | 2.3 |
| 12/05/86 | 1477 | .020 | 10.2 | 1.5 | 1.4 |
| 12/06/86 | 1324 | .019 | 7.0 | 1.7 | 1.0 |

*mg/l

The average soluble organic carbon concentration in the mixed liquor of the test train was 40 mg/l with a range of 22 to 56 mg/l. Effluent quality remained good throughout the test.

Between December 19 and December 24, aeration basin feed pH to K and L basins was about 4.3 and decreased to about 2.6 thereafter. Solids concentration increased from about 0.37 percent suspended solids before the test to about 0.5 to 0.52 percent solids during the test. The test aeration basins mixed liquor temperature was generally in the low 60° F. range during most of the test. However, between December 20 and December 22 L basin mixed liquor was about 72° F.

Figure 13:
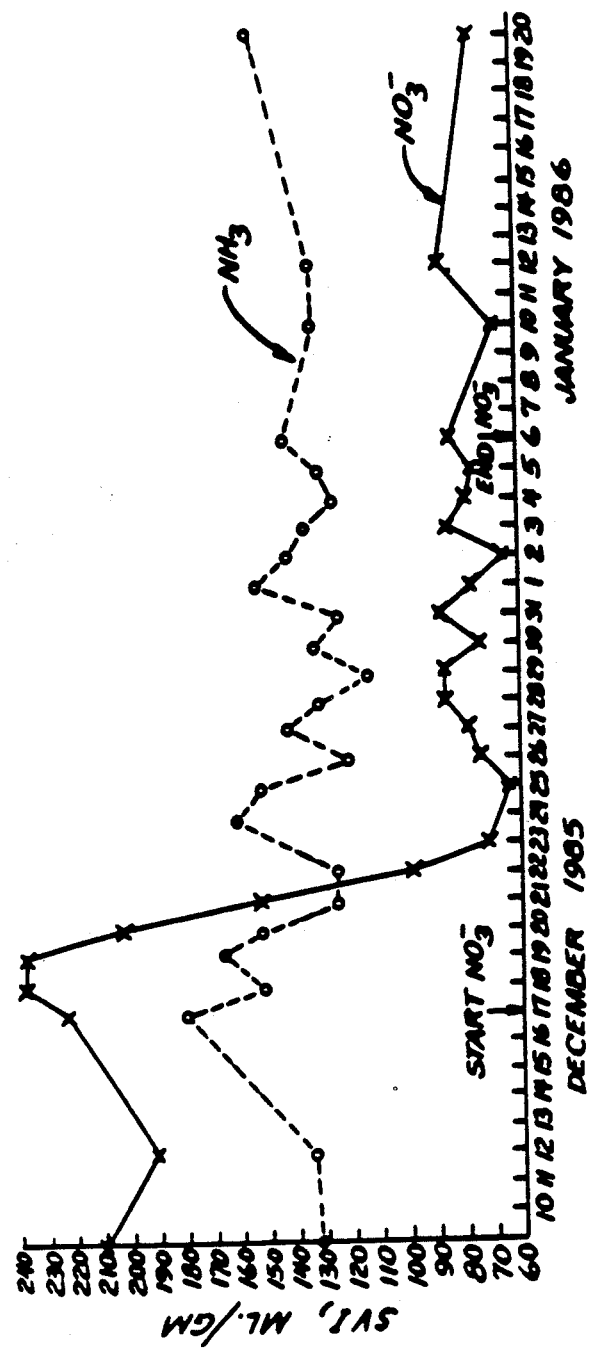
FIGS. 13 and 14 graphically compare settling rates and compaction properties between conventional processes and processes employing the present invention with particular reference to Example 6.
Figure 14:
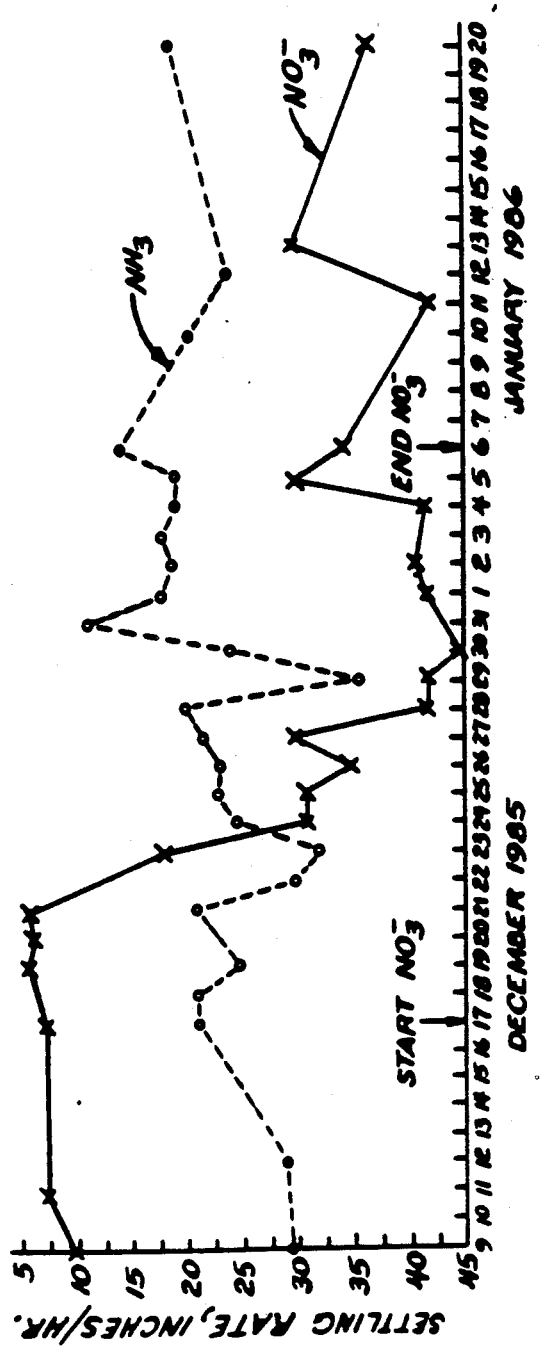

Laboratory measurements determined that sludge compaction as determined by the SVI test, improved about 280 percent in 7 days for the test units K and L. Sludge settling rate improved by about 670 percent in twelve days as illustrated in FIGS. 13 and 14. The broken line represents basins fed a reduced nitrogen source ammonia, and the solid line represents basins fed an oxidized nitrogen source nitric acid.

At the beginning of the test, the filaments were homogeneously dispersed throughout the biomass of all biox units. After about seven days into the test the filaments were well incorporated into large complex flocs in the test basin. Several days into the test, the biomass growth rate in the test basins increased sharply in response to a large increase in organic loading.

The test suggests that substituting an oxidized nitrogen source in place of a reduced nitrogen source while maintaining total nitrogen concentration reduces filamentous growth in aerobic waste treatment processes. Individuals skilled in the art will recognize that the relative amounts of reduced nitrogen to oxidized nitrogen can be adjusted for individual needs depending upon the degree of filamentous growth. A substantially total replacement of reduced nitrogen with oxidized oxygen is preferred; however, one could expect significant control of filamentous growth with less than total replacement.

Thus, the present invention provides apparatus and methods for controlling filamentous growth in aerobic waste treatment processes. Methods of the present invention require limited equipment modifications and changes to operating parameters. Further, the present methods and apparatus are cost effective in improving the quality of the final effluent of the waste treatment process.

While preferred embodiments have been illustrated and described, it is understood that the present invention is capable of variation and modification and, therefore, should not be limited to the precise details set forth but should include such changes and alterations that fall within the purview of the following claims.

I claim:

1. A method of reducing the growth of filamentous organisms in an aerobic wastewater treatment process in which the wastewater is deficient in nitrogen comprising the step of:

adding to wastewater deficient in nitrogen, a nitrogen source selected from the group of nitrogen sources consisting essentially of an oxidized nitrogen source and reduced nitrogen source being added alternately and to the substantial exclusion of each other, and said oxidized nitrogen source being added for periods not exceeding approximately two sludge ages, wherein said nitrogen source supplies substantially all the nitrogen requirements of said aerobic process, said oxidized nitrogen source is selected from the group of nitrogen compounds consisting of sodium nitrate, nitric acid, nitrous acid, sodium nitrite, and calcium nitrate, and said reduced nitrogen source is represented by the formula:

$$X-NH_Z$$

wherein "X" is an organic or inorganic moiety capable of disassociation or being metabolized to release the $NH_Z$ moiety and "Z" is the integer 1, 2, 3, or 4.

2. The method of claim 1 wherein the reduced nitrogen source is ammonia.

3. The method of claim 1 wherein said oxidized nitrogen source is nitric acid.

* * * * *